(12) United States Patent
Fujioka et al.

(10) Patent No.: US 12,257,576 B2
(45) Date of Patent: Mar. 25, 2025

(54) BIOCHEMICAL CARTRIDGE AND BIOCHEMICAL ANALYSIS DEVICE

(71) Applicant: Hitachi High-Tech Corporation, Tokyo (JP)

(72) Inventors: Michiru Fujioka, Tokyo (JP); Sakuichiro Adachi, Tokyo (JP); Toshiaki Hiratsuka, Tokyo (JP); Asami Terakado, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 967 days.

(21) Appl. No.: 17/275,328

(22) PCT Filed: Oct. 17, 2018

(86) PCT No.: PCT/JP2018/038591
§ 371 (c)(1),
(2) Date: Mar. 11, 2021

(87) PCT Pub. No.: WO2020/079767
PCT Pub. Date: Apr. 23, 2020

(65) Prior Publication Data
US 2022/0048023 A1    Feb. 17, 2022

(51) Int. Cl.
*B01L 3/00* (2006.01)
*B01L 7/00* (2006.01)

(52) U.S. Cl.
CPC .............. *B01L 3/502* (2013.01); *B01L 7/00* (2013.01); *B01L 2200/025* (2013.01);
(Continued)

(58) Field of Classification Search
CPC ...... B01L 3/502; B01L 7/00; B01L 2200/025; B01L 2200/026; B01L 2200/04;
(Continued)

(56) References Cited

U.S. PATENT DOCUMENTS

2002/0043463 A1   4/2002  Shenderov
2004/0216516 A1*  11/2004  Sato ................ B01L 3/502715
                                                                29/428
(Continued)

FOREIGN PATENT DOCUMENTS

CN        1769896 A    5/2006
CN      104588136 A    5/2015
(Continued)

OTHER PUBLICATIONS

Great Britain Examination Report dated Mar. 9, 2022 for Great Britain Patent Application No. 2102910.3.
(Continued)

*Primary Examiner* — Jill A Warden
*Assistant Examiner* — Jacqueline Brazin
(74) *Attorney, Agent, or Firm* — Volpe Koenig

(57) ABSTRACT

Since a few kilovolts of an application voltage is necessary to take in a biological sample, an EWOD electrode, for example, is destroyed, and the electrode becomes non-reusable for moving a droplet. Therefore, an object of the present invention is to provide a biochemical cartridge usable for multiple times for taking in a biological sample by a capillary array, for example, and a biochemical analysis device using the biochemical cartridge. In order to solve the problem, the biochemical cartridge according to the present invention includes a passage through which a sample is transported, a plurality of electrodes disposed on the passage along a direction in which a sample is transported, the plurality of electrodes being provided to transport a sample, and an opening provided opposite to the plurality of electrodes disposed on a downstream side of the passage.

9 Claims, 5 Drawing Sheets

(52) U.S. Cl.
CPC ..... *B01L 2200/026* (2013.01); *B01L 2200/04* (2013.01); *B01L 2200/16* (2013.01); *B01L 2300/046* (2013.01); *B01L 2300/0838* (2013.01); *B01L 2300/0867* (2013.01); *B01L 2300/1894* (2013.01); *B01L 2400/0427* (2013.01)

(58) Field of Classification Search
CPC .......... B01L 2200/16; B01L 2300/046; B01L 2300/0838; B01L 2300/0867; B01L 2300/1894; B01L 2400/0427; B01L 7/525; B01L 2200/027; B01L 2300/044; B01L 2300/0816; B01L 3/502715; B01L 3/502792; G01N 27/44791; G01N 1/00; G01N 35/08; G01N 37/00
USPC ....................................... 435/287.2
See application file for complete search history.

(56) References Cited

U.S. PATENT DOCUMENTS

| | | | | |
|---|---|---|---|---|
| 2005/0158787 | A1* | 7/2005 | Hongo | G01N 33/5438 435/287.2 |
| 2006/0097155 | A1 | 5/2006 | Adachi et al. | |
| 2006/0141469 | A1* | 6/2006 | Rossier | B01L 3/502707 436/514 |
| 2006/0164490 | A1 | 7/2006 | Kim et al. | |
| 2009/0085588 | A1* | 4/2009 | Papadakis | C12Q 1/6816 324/722 |
| 2009/0215194 | A1* | 8/2009 | Magni | B01L 3/502707 422/68.1 |
| 2010/0062414 | A1* | 3/2010 | Yamamoto | G01N 33/558 422/68.1 |
| 2010/0307917 | A1 | 12/2010 | Srinivasan et al. | |
| 2011/0253360 | A1* | 10/2011 | Huang | G06F 1/206 165/96 |
| 2014/0374259 | A1* | 12/2014 | Vann | B01L 3/0268 204/600 |
| 2015/0212043 | A1 | 7/2015 | Pollack | |
| 2018/0104695 | A1 | 4/2018 | Walton et al. | |

FOREIGN PATENT DOCUMENTS

| | | |
|---|---|---|
| JP | 2006-329901 A | 12/2006 |
| JP | 2008046140 * | 2/2008 |
| JP | 2009-534653 A | 9/2009 |
| JP | 2016-109499 A | 6/2016 |
| WO | 2007/120241 A2 | 10/2007 |
| WO | 2008/126403 A1 | 7/2010 |
| WO | 2014/004908 A1 | 1/2014 |

OTHER PUBLICATIONS

PCT/JP2018/038591 International Search Report, Jan. 15, 2019, 2pgs.
German Office Action issued on Nov. 30, 2022 for German Patent Application No. 112018007861.2.
Chinese Office Action issued on Jan. 10, 2024 for Chinese Patent Application No. 201880096753.3.

* cited by examiner

BIOCHEMICAL CARTRIDGE AND BIOCHEMICAL ANALYSIS DEVICE

TECHNICAL FIELD

The present invention relates to a biochemical cartridge used for synthesizing, as necessary, a biological sample extracted by biochemical reactions for analysis and a biochemical analysis device using this biochemical cartridge.

BACKGROUND ART

Genomic analysis such as base sequence analysis and polymorphism analysis is remarkably important in the field of biological studies, medical fields such as gene therapy and diagnosis and the development of molecular target drugs, and medical jurisprudence such as DNA examination. In genomic analysis, the following processes are performed: 1) the process of extracting nucleic acid from a specimen; 2) the process of amplifying the extracted nucleic acid for labeling; and 3) the process of electrophoresis reading the base sequence of the nucleic acid. In process 2), the nucleic acid mixed with the reagent is kept at a predetermined temperature, a primer anneals the nucleic acid to be a target, and the nucleic acid is amplified.

Patent Literature 1 discloses the use of a technique of Electro Wetting On Dielectric (EWOD) for process 2). That is, Patent Literature 1 discloses that nucleic acid or the droplet of a reagent is transported in a droplet microactuator using EWOD, the nucleic acid is amplified, and then the nucleic acid is analyzed on the downstream side by electrophoresis.

CITATION LIST

Patent Literature

Patent Literature 1: Japanese Unexamined Patent Application Publication (Translation of PCT Application) No. 2009-534653

SUMMARY OF INVENTION

Technical Problem

However, Patent Literature 1 discloses no specific method of supplying the nucleic acid after amplified to a biochemical analysis device such as a capillary sequencer. The droplet is transported at a few tens of volts of an application voltage in EWOD, whereas in order to take in a biological sample, nucleic acid, for example, in a droplet into the capillary array of the capillary sequencer, for example, a few kilovolts of an application voltage is needed, and this destroys EWOD electrodes and any other components, resulting in no reuse of EWOD for moving droplets.

Therefore, an object of the present invention is to provide a biochemical cartridge usable for multiple times for taking in a biological sample by a capillary array, for example, and a biochemical analysis device using the biochemical cartridge.

Solution to Problem

In order to achieve the object, a biochemical cartridge according to the present invention includes a passage through which a sample is transported, a plurality of electrodes disposed on the passage along a direction in which a sample is transported, the plurality of electrodes being provided to transport a sample, and an opening provided opposite to the plurality of electrodes disposed on a downstream side of the passage.

A biochemical analysis device according to the present invention includes a capillary, a passage through which a sample is transported, a plurality of first electrodes disposed on the passage along a direction in which a sample is transported, the plurality of first electrodes being provided to transport a sample, an opening opposite to the plurality of electrodes disposed on a downstream side of the passage, and a second electrode provided to introduce a sample in the passage to the capillary.

Advantageous Effects of Invention

According to the present invention, a biochemical cartridge usable for multiple times for taking in a biological sample by a capillary array, for example, and a biochemical analysis device using the biochemical cartridge can be provided.

DESCRIPTION OF EMBODIMENTS

Figure 1:
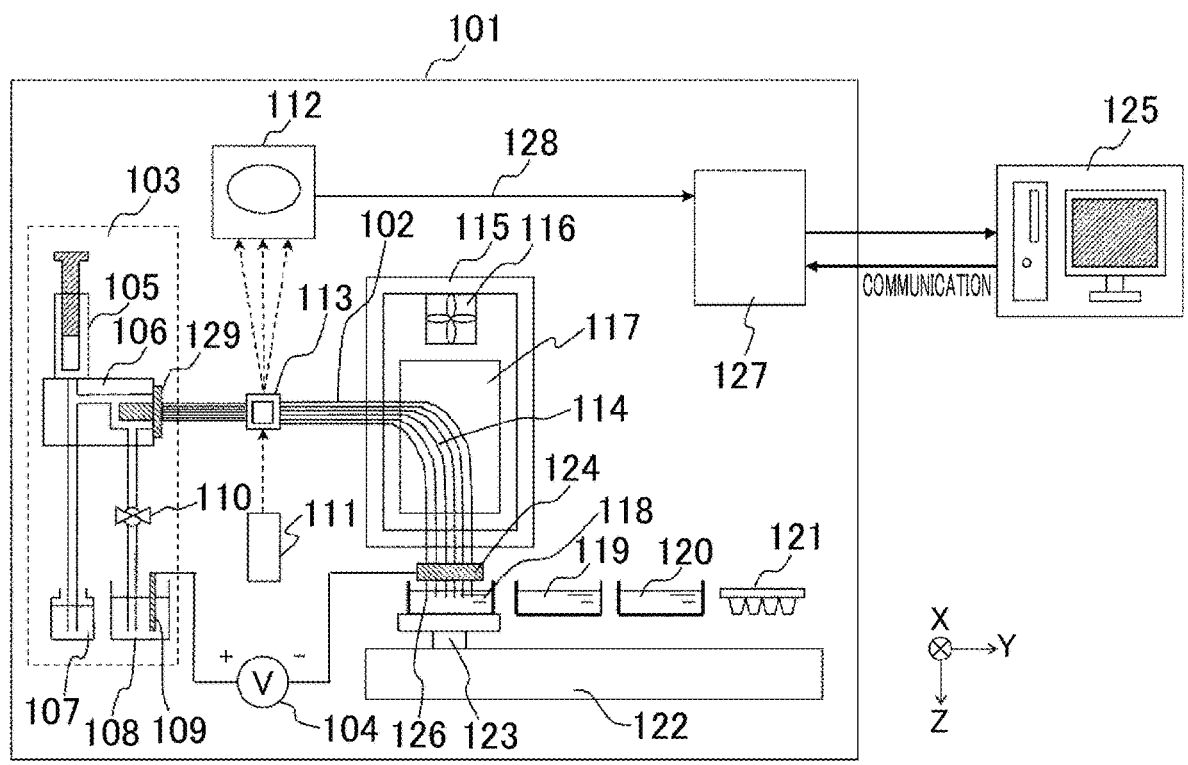
FIG. 1 is a diagram showing the overall structure of a biochemical analysis device according to a first embodiment.

In the following, embodiments of a biochemical analysis device according to the present invention will be described with reference to the drawings. Note that in order to indicate the orientations in the drawings, XYZ coordinate systems are written in the drawings.

First Embodiment

FIG. 1 shows the overall structure of a biochemical analysis device. The biochemical analysis device according to the present invention exemplifies a device performing electrophoresis amplifying nucleic acid extracted from a test sample, labeling the nucleic acid, and then reading the base sequence of the nucleic acid. In order to amplify nucleic acid, the nucleic acid mixed with a reagent is kept at a predetermined temperature, or in order to perform electrophoresis, the amplified nucleic acid is supplied to a thin tube called a capillary.

A device main body 101 is connected to a control computer 125 with a communication cable. The control computer 125 accepts an input from an operator, controls the functions of the biochemical analysis device, gives and receives data detected at the device main body 101, and displays data that is given and received. The device main body 101 includes a capillary array 114, a pump mechanism 103, a thermostat 115, the conveyor 122, a high-voltage power supply 104, a light source 111, and an optical detector 112. In the following, these components will be described.

The capillary array 114 is a replacement member composed of one or a plurality (e.g. two to 96) of capillaries 102, including a load header 124, a detecting unit 113, and a capillary head 129. At one end of the capillary array 114, the load header 124 is provided to supply a sample into the capillary 102, forming a cathode end 126 to which a negative voltage is applied. At the other end of the capillary array 114, a plurality of capillaries 102 is bundled in one by the capillary head 129, and is connected in a pressure-proof secret structure to a gel block 106. The detecting unit 113, to which laser light is applied, is provided between the load header 124 and the capillary head 129.

The capillary 102 is a glass tube having an inner diameter a few tens to a few hundreds μm and an outer diameter of a few hundreds μm. In order to improve the strength of the capillary 102, the surface is covered with a polyimide coating. However, the polyimide coating is removed from the detecting unit 113 and the vicinity of the detecting unit 113, to which laser light is applied. The inside of the capillary 102 is filled with a separation medium that separates DNA molecules in the sample. The separation medium is a polyacrylamide separation gel, for example.

The pump mechanism 103 is composed of a syringe 105 and a mechanical system that pressurizes the syringe 105. The gel block 106 is a connecting unit that joins the syringe 105, the capillary array 114, an anode buffer container 108, and a separation medium container 107. The motor-operated valve 110 is closed, the syringe 105 is pressed in, and the separation medium in the syringe 105 is injected into the inside of the capillary 102.

The thermostat 115 has a heater 117 and a fan 116 for controlling the temperature of the capillary array 114, and is covered with a heat insulator ion order to keep the temperature in the thermostat 115 constant. Controlling the temperature in the thermostat 115 keeps the temperature in the most part of the capillary array 114 at a constant temperature, at a temperature of 60° C., for example.

The conveyor 122 has three electric motors and linear actuators, and the conveyor 122 is movable in three axial directions, vertical, lateral, and back-and-forth directions. On a moving stage 123 on the conveyor 122, at least one more containers are installed. The conveyor 122 transports a buffer container 118, a washing container 119, a waste fluid container 120, and a biochemical cartridge 121 on the moving stage 123 to the cathode end 126 of the capillary 102. In the buffer container 118, an electrophoretic buffer solution is put. The washing container 119 is used for washing the capillary 102. Into the waste fluid container 120, the separation medium in the capillary 102 is discharged. In the biochemical cartridge 121, a biological sample, nucleic acid and a reagent, for example, is put. The nucleic acid amplified in the biochemical cartridge 121 is taken in from the cathode end 126 of the capillary 102 into the capillary array 114. The biochemical cartridge 121 will be described later referring to FIG. 2 to FIG. 5.

The high-voltage power supply 104 is connected to an anode electrode 109 in the anode buffer container 108 and the load header 124, and applies a high voltage to the separation medium in the capillary 102.

The light source 111 applies laser light that is coherent light as pumping light to the detecting unit 113. The optical detector 112 optically detects fluorescence emitted from the sample in the detecting unit 113. The detected optical data 128 is transferred to the control computer 125 through a control substrate 127.

Figure 2:
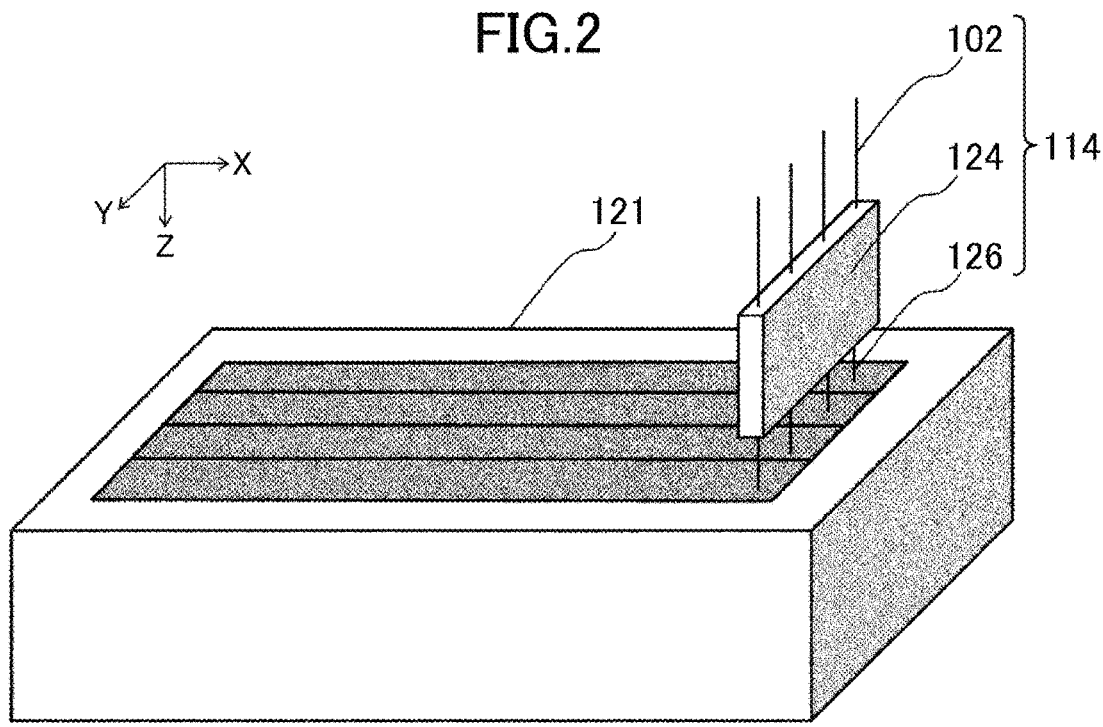
FIG. 2 is a perspective view illustrating a biochemical cartridge according to the first embodiment.

Referring to FIG. 2, the biochemical cartridge 121 will be described. FIG. 2 is a perspective view of the biochemical cartridge 121. The biochemical cartridge 121 is provided with one or a plurality, four, for example, of passages in which nucleic acid is amplified, and the cathode end 126 of the capillary 102 is inserted into each of the passages. Note that in FIG. 2, the long direction of the passage is an X-direction, the direction in which the passages are arranged is a Y-direction, and the direction into which the cathode end 126 is inserted is a Z-direction.

Figure 3:
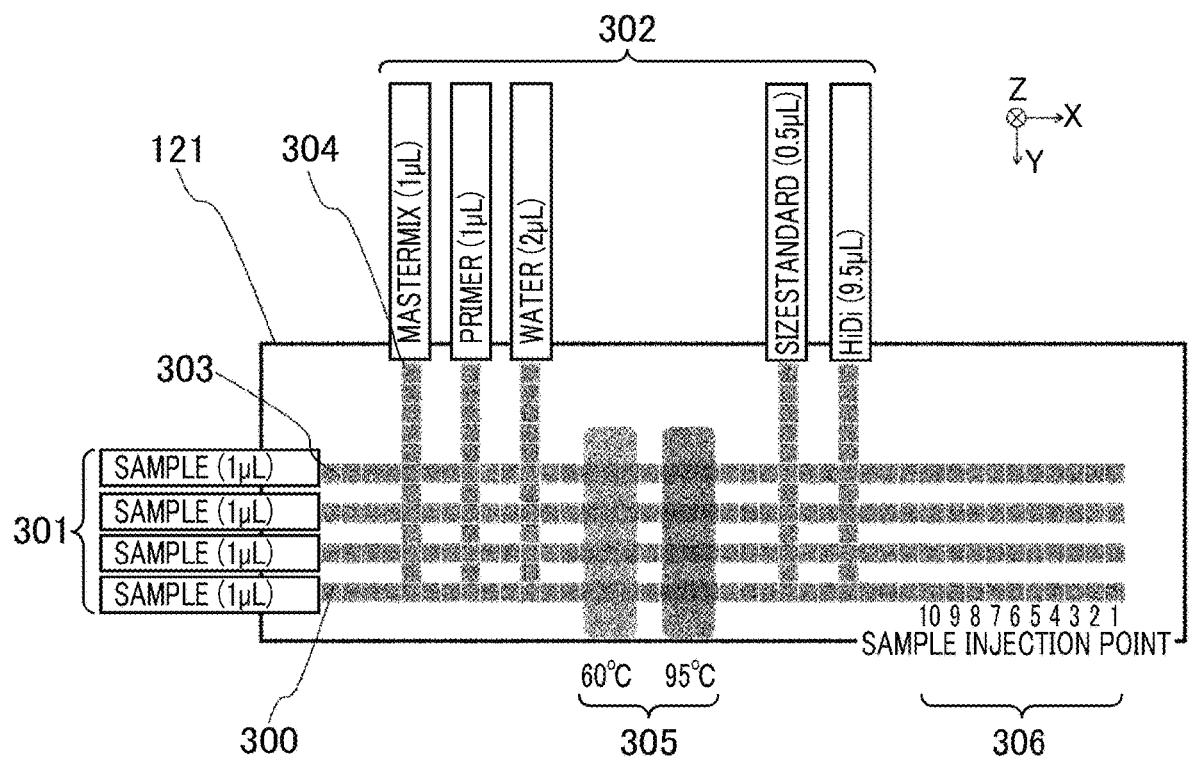
FIG. 3 is a plan view illustrating a sample passage, a reagent passage, and a droplet retaining unit in the biochemical cartridge according to the first embodiment.

Referring to FIG. 3, the structure in the biochemical cartridge 121 will be described. FIG. 3 is a plan view of the inside of the biochemical cartridge 121. In the biochemical cartridge 121 in FIG. 3, a sample chamber 301, a reagent chamber 302, a sample passage 303, and a reagent passage 304 are provided. A plurality, four, for example, of the sample chambers 301 are provided, and one microliter, for example, of a sample containing a biological sample is put in the sample chambers 301. Alternatively, ten microliters of a sample may be put in the sample chamber 301, and one microliter of the sample may be separated from ten microliters of the same for use. There is one or a plurality of the reagent chambers 302. For example, in the case in which nucleic acid is amplified, five reagent chambers 302 are provided. In the reagent chambers 302, reagents used for amplifying the nucleic acid, are put, including a primer, dNTP, a buffer solution, water, an enzyme, a denaturing agent, and a size standard DNA, for example.

The sample passages 303 are individually connected to the sample chambers 301, and a droplet containing nucleic acid is transported. In the present embodiment, the direction in which a droplet containing nucleic acid is transported is the X-direction. In the case in which a technique of Electro Wetting On Dielectric (EWOD) is used for transporting the droplet, the sample passage 303 is a passage having an EWOD electrode 300 for transporting the droplet. EWOD is a technique in which a voltage is applied across a droplet disposed on a water-repellent film that is a film of water repellency and an EWOD electrode that is an electrode provided under the water-repellent film, the surface tension of the droplet is controlled, and thus the droplet is transported.

Figure 4:
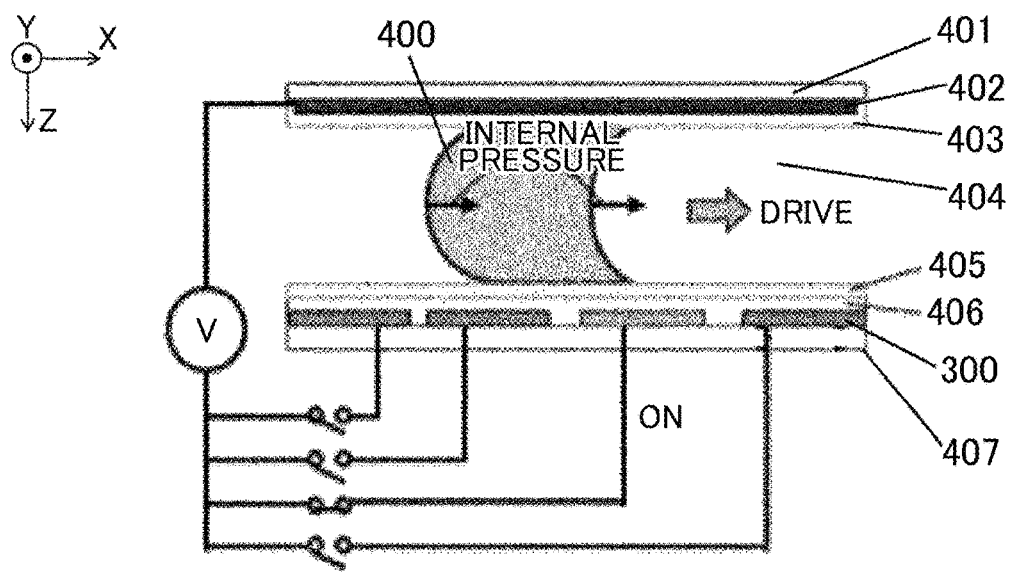
FIG. 4 is a cross sectional view illustrating Electro Wetting On Dielectric (EWOD) according to the first embodiment.

Referring to FIG. 4, and example passage using EWOD will be described. FIG. 4 is a X-Z cross sectional view of a passage using EWOD. The passage using EWOD has a top plate 401, an upper electrode 402, an upper water-repellent film 403, a lower water-repellent film 405, an insulating film 406, an EWOD electrode 300, and an under plate 407. The top plate 401 and the under plate 407 are disposed in parallel. On the under surface of the top plate 401, the upper electrode 402 and the upper water-repellent film 403 are provided, and on the top surface of the under plate 407, a plurality of EWOD electrodes 300, the insulating film 406, and the lower water-repellent film 405 are provided. Note that when a plurality of EWOD electrodes 300 is disposed at least one of the top plate 401 and the under plate 407, the transportation of a droplet 400 is possible.

The plurality of EWOD electrodes 300 is arranged along the direction in which the droplet 400 is transported. The EWOD electrode 300 is covered with the insulating film 406 having a thickness of a few hundreds μm, for example, such that a voltage can be individually applied to the EWOD electrodes 300. Preferably, a space between the upper water-repellent film 403 and the lower water-repellent film 405 is filled with a fluid 404 that is not mixed with the droplet 400 to be transported. Note that the transportation of the droplet 400 is possible with no the fluid 404 filled.

In such a passage using EWOD, when a voltage of a few tens of volts is applied to the EWOD electrode 300 located near the droplet 400, the surface tension of the droplet 400 on the side of the EWOD electrode 300 to which the voltage is applied is changed, and an internal pressure is generated in the droplet 400. Since the generated internal pressure drives the droplet 400 in the direction of an arrow in FIG. 4, the droplet 400 is transported. That is, the droplet 400 is transported to the side of the EWOD electrode 300 to which the voltage is applied.

Again referring to the description of FIG. 3. The reagent passages 304 are individually connected to the reagent chambers 302, and the droplet of the reagent is transported. In the present embodiment, the direction in which the droplet of the reagent is transported is the Y-direction. In the case in which EWOD is used for transporting the droplet of the reagent, the reagent passage 304 has a plurality of EWOD electrodes 300 similarly to the sample passage 303. The reagent passage 304 intersects with the sample passage 303, and the droplet containing nucleic acid is mixed with the droplet of the reagent at the intersection of the reagent passage 304 and the sample passage 303. Note that an angle at which the reagent passage 304 intersects with the sample passage 303 is not limited to an angle of 90 degrees as shown in FIG. 3.

The EWOD electrodes 300 on the sample passage 303 and the reagent passage 304 can separately apply a voltage, and thus two or more droplets can also be transported simultaneously. The direction in which the droplet is transported is not limited to one direction, and the droplet may be reciprocated. For example, mixing nucleic acid with the reagent may be promoted by reciprocating the droplet between the intersection of the sample passage 303 and the reagent passage 304 and the point adjacent to the intersection.

In the midway point of the sample passage 303, a temperature control region 305 is provided. The temperature control region 305 is one or more regions in which the temperature is kept at a predetermined temperature, a region kept at a temperature of 60° C., for example, and a region kept at a temperature of 95° C. The droplet having the nucleic acid and the reagent mixed is transported to the temperature control region 305, and the nucleic acid is amplified by a Polymerase Chain Reaction (PCR) or a cycle sequence reaction, for example. Note that the droplet may be reciprocated between the regions kept at different temperatures, the region at a temperature of 60° C. and the region at a temperature of 95° C., for example. The droplet having the nucleic acid amplified is labeled to be a sample droplet.

At the tip of the sample passage 303, a droplet retaining unit 306 is provided. The droplet retaining unit 306 has a plurality of sample injection points, at ten places, for example. Each of the sample injection points includes the EWOD electrode 300 to control a voltage applied to the EWOD electrode 300, and thus the sample droplet is transported to the position of a desired sample injection point, and the sample droplet is retained at the position. Preferably, the spacing between the EWOD electrodes 300 of the droplet retaining unit 306 is the same as the spacing between the EWOD electrodes 300 of the sample passage 303 or the reagent passage 304. Providing the same spacing facilitates the manufacture of the EWOD electrode 300.

Figure 5:
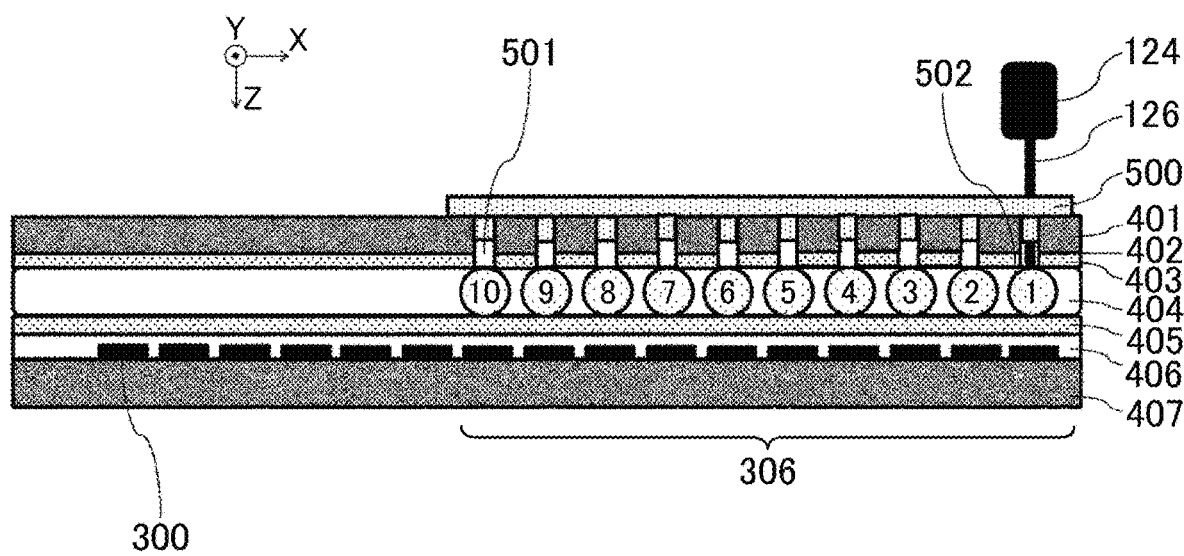
FIG. 5 is a cross sectional view illustrating the droplet retaining unit according to the first embodiment.

Referring FIG. 5, the droplet retaining unit 306 according to the present embodiment will be described. FIG. 5 is a X-Z cross sectional view of the droplet retaining unit 306. The droplet retaining unit 306 has a septum 500, the top plate 401, the upper electrode 402, the upper water-repellent film 403, the lower water-repellent film 405, the insulating film 406, the EWOD electrode 300, and the under plate 407. The lower water-repellent film 405, the insulating film 406, the EWOD electrode 300, and the under plate 407 are the same configurations shown in FIG. 4, and the description is omitted.

The top plate 401, the upper electrode 402, and the upper water-repellent film 403 are the same configurations shown in FIG. 4 except having an opening 501. The opening 501 is opened at the position at which each of the EWOD electrodes 300 is disposed on the droplet retaining unit 306 along the Z-direction. That is, the EWOD electrode 300 of the droplet retaining unit 306 and the opening 501 have the same numbers.

The septum 500 is a rubber member disposed so as to cover the top surface of the top plate 401, and has a hole into which the cathode end 126 of the capillary 102 is inserted. The parts of the septum 500 having the hole are individually inserted into the openings 501. That is, one sample injection point includes one EWOD electrode 300 of the droplet retaining unit 306, the opening 501 opened above the EWOD electrode 300, and the hole of the septum 500 inserted into the opening 501.

When a sample droplet 502 is transported to the position of a desired sample injection point, the cathode end 126 of the capillary 102 is inserted at the position until the cathode end 126 contacts the sample droplet 502. FIG. 5 exemplifies a state in which the sample droplet 502 to which number 1 is given is in contact with the cathode end 126. In this state, a voltage of a few kilovolts is applied to the load header 124 or a short time, and nucleic acid in the sample droplet 502 is taken in the inside of the capillary array 114. The nucleic acid taken in the inside of the capillary array 114 is guided to the detecting unit 113, pumping light is applied, and fluorescence is detected.

At the sample injection point used for taking in the nucleic acid in the sample droplet 502, the insulating film 406 or the EWOD electrode 300 is destroyed due to a few kilovolts of an application voltage, and become non-reusable. Therefore, in the present embodiment, a plurality of sample injection points is provided, the sample injection point used for taking in the nucleic acid is changed every time when the nucleic acid is taken in. That is, the droplet retaining unit 306 according to the present embodiment has a plurality of EWOD electrodes 300 for retaining the sample droplet 502, and a different EWOD electrode 300 is used every time when the nucleic acid in the sample droplet 502 is taken in the inside of the capillary array 114. According to the present embodiment, EWOD can be used a plurality of times for taking in the nucleic acid by the capillary array 114.

Note that for taking in the nucleic acid by the capillary array 114, preferably, the EWOD electrode 300 is used in order of the EWOD electrode 300 at the tail end, i.e., in order of the number given to the sample droplet 502 in FIG. 5, for example. with the use of the plurality of EWOD electrodes 300 in such order, the EWOD electrodes 300 of the droplet retaining unit 306 can be fully used.

In the present embodiment, the case is described in which nucleic acid, DNA, is specifically handled as an example of a biological sample. However, biological samples handled in the present invention is not limited to this, including general biological materials such as RNA, protein, polysaccharides, and microorganisms. For taking in a biological sample, a component other than the capillary 102 may be used.

Second Embodiment

In the first embodiment, the description is made in which the spacing between the openings 501 into which the cathode end 126 of the capillary 102 is inserted is the same as the spacing between the EWOD electrodes 300 of the droplet retaining unit 306. In the case in which the spacing between the EWOD electrodes 300 of the droplet retaining unit 306 is too narrow, the area around the EWOD electrode 300 used for taking in the nucleic acid by the capillary array 114 is sometimes destroyed due to the application voltage to the load header 124. Therefore, in the present embodiment, a configuration will be described in which the spacing between openings 501 is widened, EWOD can be used for taking in the nucleic acid a plurality of times even in the case in which the area around an EWOD electrode 300 used for taking in the nucleic acid is destroyed.

Figure 6:
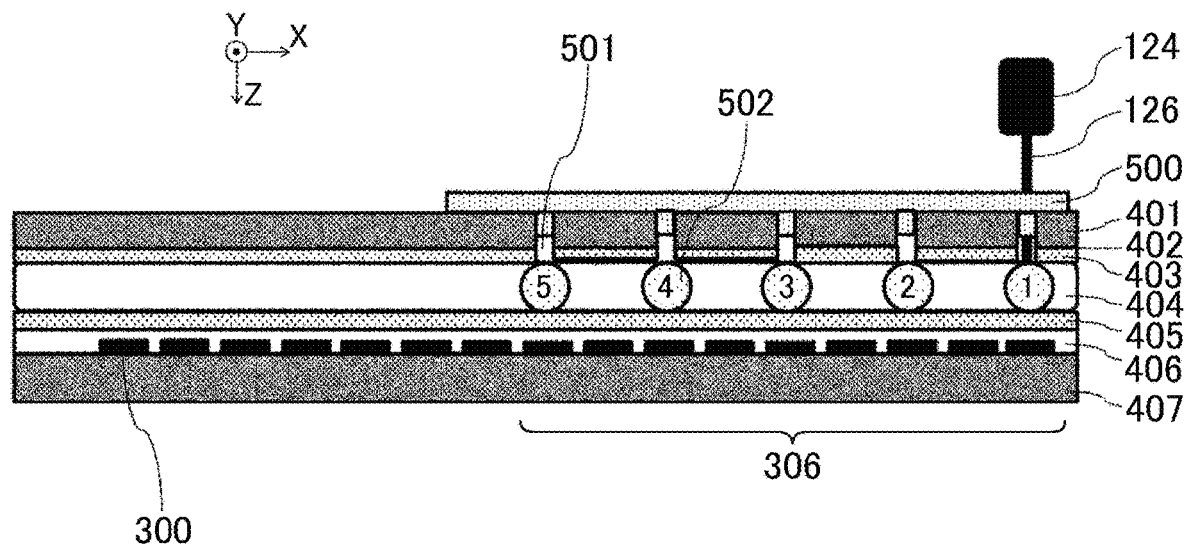
FIG. 6 is a cross sectional view illustrating a droplet retaining unit according to a second embodiment.

Referring to FIG. 6, a droplet retaining unit 306 according to the present embodiment will be described. Similarly to FIG. 5, FIG. 6 is a X-Z cross sectional view of the droplet retaining unit 306. Similarly to the first embodiment, the droplet retaining unit 306 has a septum 500, a top plate 401, an upper electrode 402, an upper water-repellent film 403, a lower water-repellent film 405, an insulating film 406, an EWOD electrode 300, and an under plate 407, and the upper water-repellent film 403 is provided with an opening 501. However, the opening 501 according to the present embodiment is provided in a spacing wider than the EWOD electrode 300, in a spacing with no influence of destruction due to the application voltage to a load header 124, for example. The opening 501 is provided in such a spacing, and thus the EWOD electrode 300 under the opening 501 adjacent to the opening 501 having been used for taking in the nucleic acid is not destroyed even in the case in which the area around the EWOD electrode 300 used for taking in the nucleic acid in the sample droplet 502 is destroyed. As a result, the nucleic acid can be taken in the capillary array 114 through the opening 501 above the EWOD electrode 300 that has not been destroyed.

According to the present embodiment, even in the case in which the area around the EWOD electrode 300 used for taking in the nucleic acid in the sample droplet 502 is destroyed, the EWOD electrode 300 under the opening 501 is not destroyed, and thus EWOD can be for taking in the nucleic acid a plurality of times.

Third Embodiment

In the first embodiment, the description is made in which the top plate 401, the upper electrode 402, and the upper water-repellent film 403 have the openings 501 in the same number as the number of the sample injection points. In the present embodiment, a configuration will be described in which a top plate 401, an upper electrode 402, and an upper water-repellent film 403 have an opening 701 shared at all sample injection points.

Figure 7:
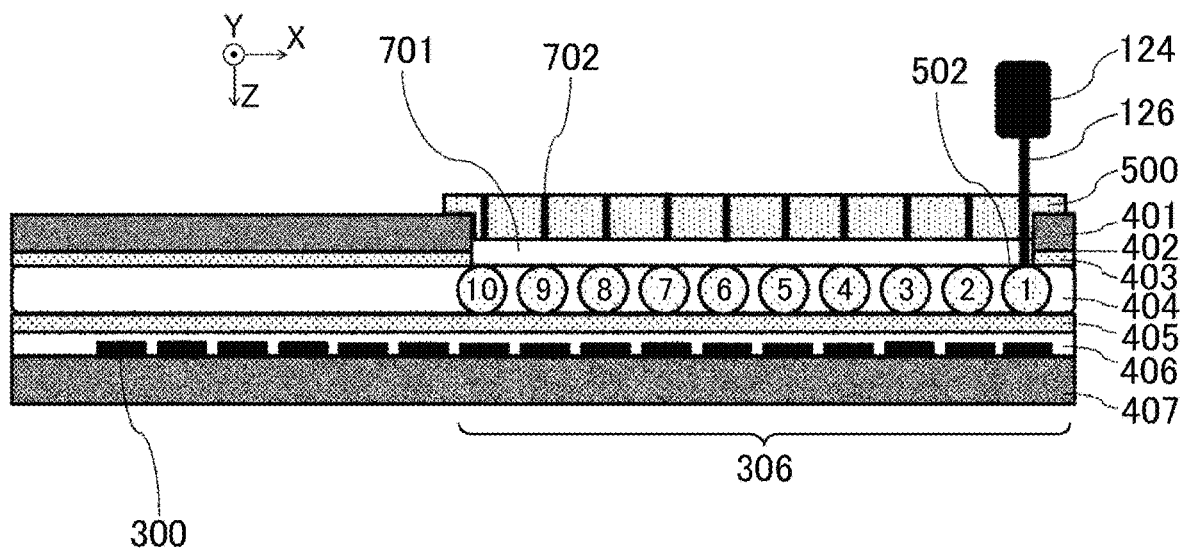
FIG. 7 is a cross sectional view illustrating a droplet retaining unit according to a third embodiment.
Figure 8:
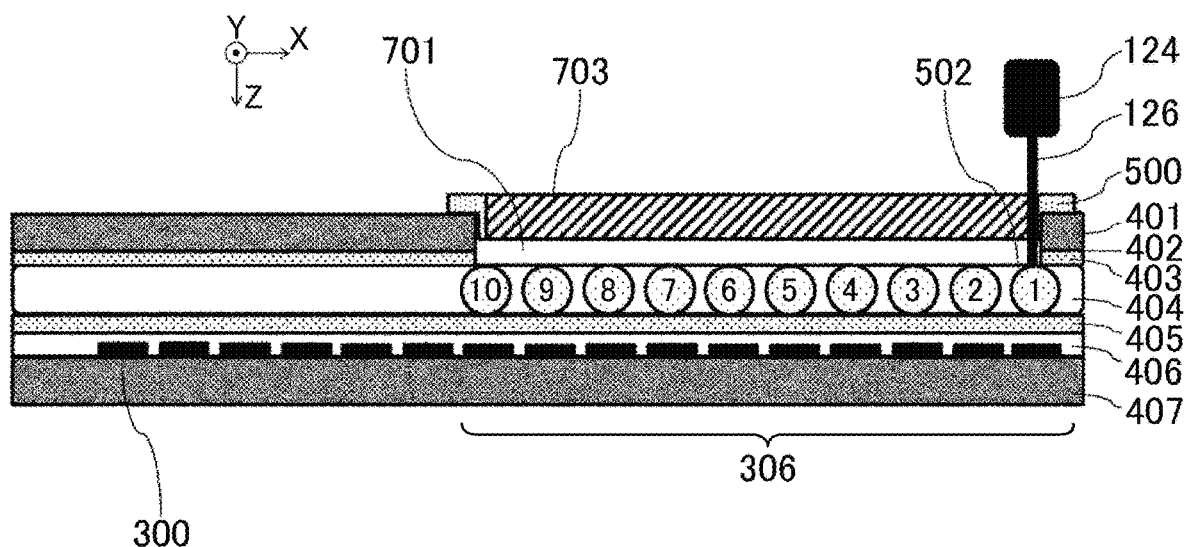
FIG. 8 is a cross sectional view illustrating a septum provided with a slit according to the third embodiment.

Referring to FIG. 7, a droplet retaining unit 306 according to the present embodiment will be described. Similarly to FIG. 5, FIG. 7 is a X-Z cross sectional view of the droplet retaining unit 306. In the present embodiment, the top plate 401, the upper electrode 402, and the upper water-repellent film 403 have one opening 701 shared in the droplet retaining unit 306. A septum 500 is disposed so as to block the opening 701. The septum 500 has an opening into which a cathode end 126 of a capillary 102 is inserted. The opening of the septum may be a plurality of holes 702 opposite to the individual EWOD electrode 300, o may be a slit 703 (see FIG. 8) across a plurality of EWOD electrodes 300. The shared opening 701 is provided, and thus the biochemical cartridge 121 and the septum 500 can be formed in a simpler configurations.

Note that the biochemical analysis device according to the present invention is not limited to the foregoing embodiments, and can be embodied with the components modified in the scope not deviating from the gist of the invention. A plurality of components disclosed in the foregoing embodiments may be appropriately combined. Some components may be removed from all the components shown in the foregoing embodiments.

REFERENCE SIGNS LIST

101: device main body
102: capillary
103: pump mechanism
104: high-voltage power supply
105: syringe
106: gel block
107: separation medium container
108: anode buffer container
109: anode electrode
110: motor-operated valve
111: light source
112: optical detector
113: detecting unit
114: capillary array
115: thermostat
116: fan
117: heater
118: buffer container
119: washing container
120: waste fluid container
121: biochemical cartridge
122: conveyor
123: moving stage
124: load header
125: control computer
126: cathode end
127: control substrate
128: optical data
129: capillary head
300: EWOD electrode
301: sample chamber
302: reagent chamber
303: sample passage
304: reagent passage
305: temperature control region
306: droplet retaining unit
400: droplet
401: top plate
402: upper electrode
403: upper water-repellent film
404: fluid
405: lower water-repellent film
406: insulating film
407: under plate
500: septum
501: opening
502: sample droplet 701: opening
702: hole
703: slit

The invention claimed is:

1. A biochemical cartridge comprising:
a cartridge body comprising a passage through which a sample is transported;
a plurality of electrodes disposed on the passage along a direction in which a sample is transported, the plurality of electrodes being configured to transport a sample; and
a plurality of openings, each opening being provided opposite to a respective one of the plurality of electrodes disposed from a proximal end of the passage along a downstream side of the passage,
wherein the plurality of the openings is provided on a single top surface of the biochemical cartridge such that the plurality of the openings is opposite to the electrodes disposed on the downstream side of the passage.

2. The biochemical cartridge according to claim 1, wherein each opening of the plurality of openings is configured to accept a single introduction of the sample and to expose a corresponding respective electrode to the single introduction of the sample.

3. The biochemical cartridge according to claim 1, wherein the openings are configured to receive samples one at a time sequentially, beginning at an opening corresponding to an electrode provided at the proximal end of the passage.

4. The biochemical cartridge according to claim 1, wherein a reagent passage is disposed in the cartridge body so as to intersect with the passage.

5. The biochemical cartridge according to claim 1, wherein a spacing between each of the plurality of openings is wider than a spacing between each of the plurality of electrodes.

6. The biochemical cartridge according to claim 1, wherein the opening is covered with a cover.

7. A biochemical cartridge comprising:
a cartridge body comprising a passage through which a sample is transported;
a plurality of electrodes disposed on the passage along a direction in which a sample is transported, the plurality of electrodes being configured to transport a sample; an opening extending across a plurality of electrodes disposed from a proximal end of the passage along a downstream side of the passage; and
a cover comprising a plurality of holes over the opening.

8. The biochemical cartridge according to claim 1, wherein for transportation of a sample on the passage, a technique of Electro Wetting On device (EWOD) is used.

9. The biochemical cartridge according to claim 1, wherein a capillary is inserted into the opening.

* * * * *